US 6,498,296 B2

(12) United States Patent
Benito-Navazo

(10) Patent No.: US 6,498,296 B2
(45) Date of Patent: *Dec. 24, 2002

(54) CONNECTOR DEVICE FOR ELECTRICAL CABLE CARRIER TRAY SECTIONS

(75) Inventor: Juan Manuel Benito-Navazo, Sant Cugat Del Valles (ES)

(73) Assignee: Aparella Electrico, S.A., Barcelona (ES)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/490,066

(22) Filed: Jan. 24, 2000

(65) Prior Publication Data

US 2002/0066586 A1 Jun. 6, 2002

(30) Foreign Application Priority Data

Feb. 14, 1999 (ES) .............................................. 9900285

(51) Int. Cl.[7] ................................................ H02G 3/04
(52) U.S. Cl. ................... 174/68.3; 174/72 A; 174/99 R; 248/49
(58) Field of Search ....................... 174/68.3, 69, 72 A, 174/98, 99 R; 248/49, 65, 68.1, 58, 67, 70

(56) References Cited

U.S. PATENT DOCUMENTS

| 3,053,358 A | * | 9/1962 | Gross ........................... 189/36 |
| 4,232,845 A | * | 11/1980 | Turner .......................... 248/49 |
| 4,432,519 A | * | 2/1984 | Wright ......................... 248/49 |
| 5,470,021 A | | 11/1995 | Looney |

FOREIGN PATENT DOCUMENTS

| GB | 2 038 109 A | 7/1980 | ............ H02G/3/00 |
| NL | 7 412 503 A | 3/1976 | ............ H02G/3/06 |

* cited by examiner

*Primary Examiner*—Dean A. Reichard
*Assistant Examiner*—W. David Walkenhorst
(74) *Attorney, Agent, or Firm*—Staas & Halsey LLP

(57) ABSTRACT

Connector device for electric cable carrier tray sections, which come together at a point of connection, each of the cable carrier tray sections including a straight elongate U-shaped body member, where each arm of the U defines a side wall and a bottom wall extends between both side walls, where the connecting device comprises at least one joining member for the connection of two electrical cable carrier tray sections, which change direction at the point of connection, and are attached together by the side walls by securing means, wherein the joining member is rigid and is differentiated in two parts, where the parts form a fixed angle therebetween in a central region of the joining member and each of the parts has means for attachment to the sections.

6 Claims, 2 Drawing Sheets

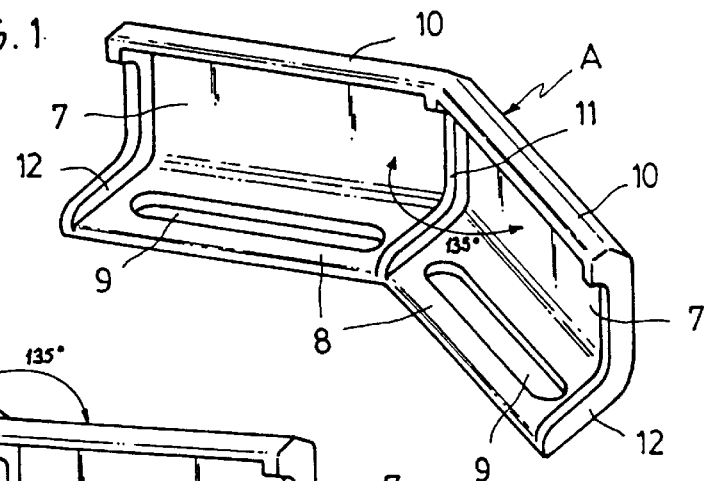
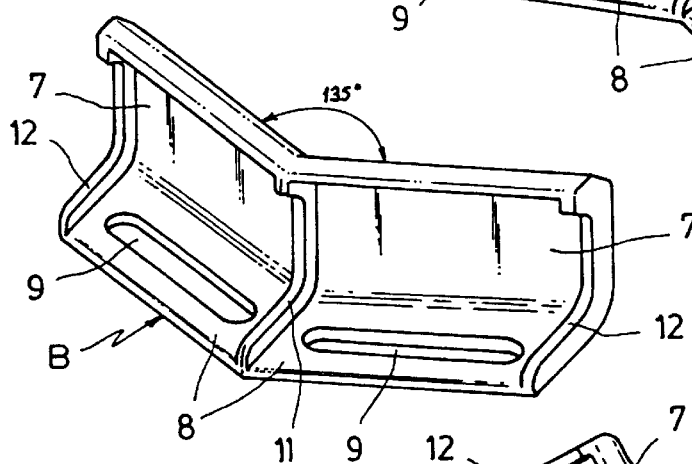
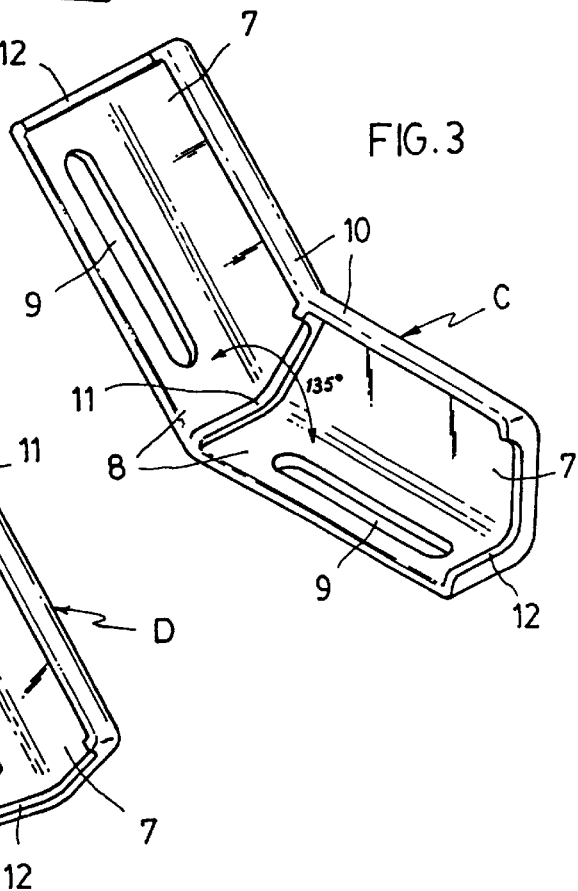
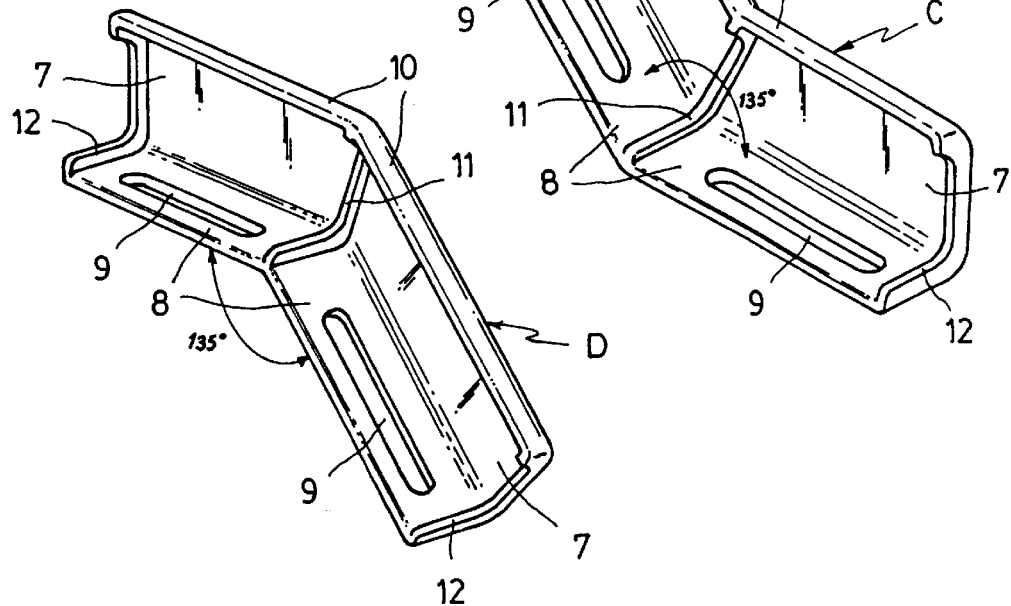

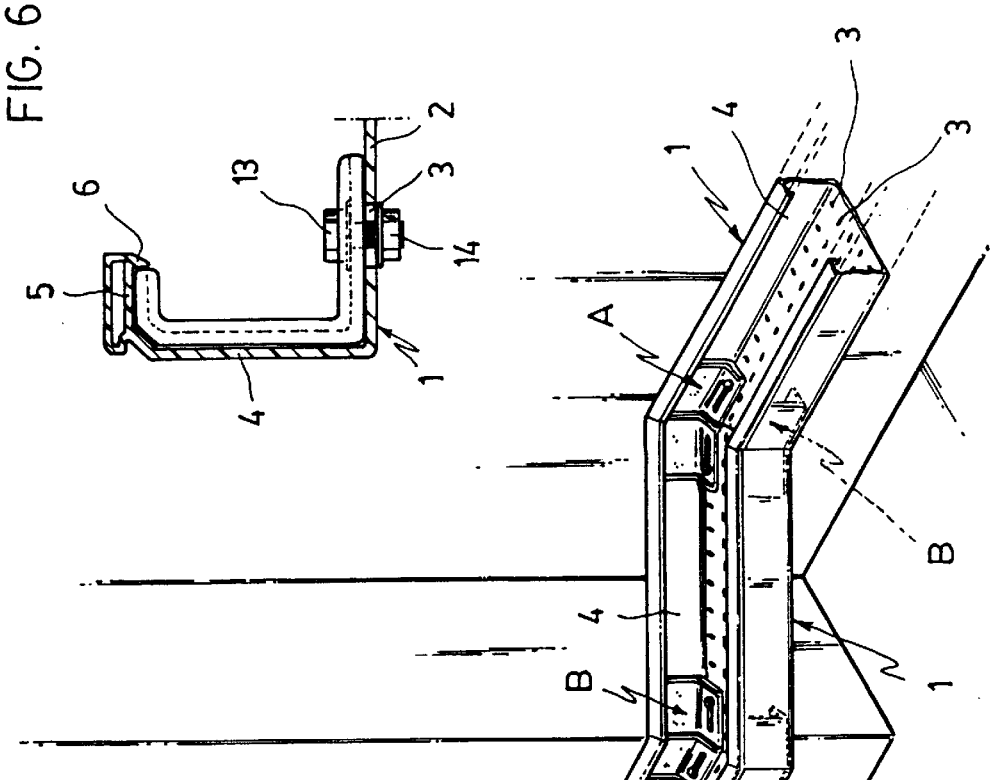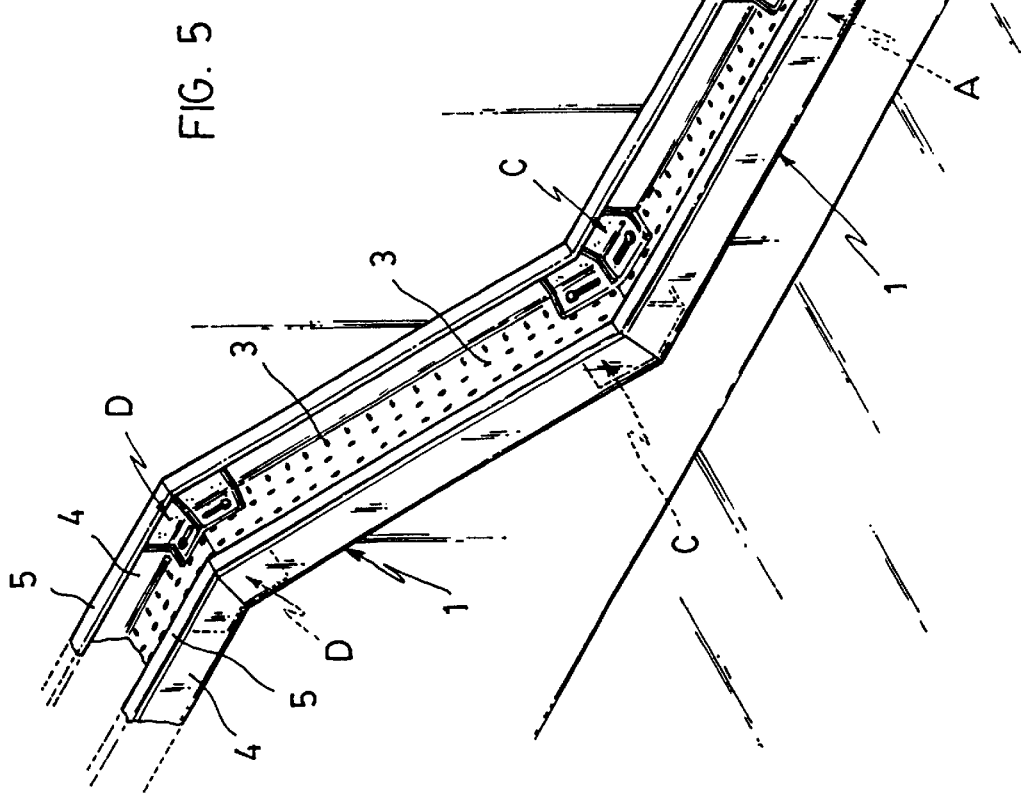

CONNECTOR DEVICE FOR ELECTRICAL CABLE CARRIER TRAY SECTIONS

BACKGROUND OF THE INVENTION

1. Field of the Invention

This invention relates to a connector device for electrical cable do carrier tray sections which come together at a point of connection, each of the electrical cable carrier tray sections comprising a straight elongate U-shaped body member, where each arm of the U defines a side wall and a bottom wall extends between both side walls, and more precisely to sets of two symmetrical or asymmetrical joining members to form a end-to-end joint of two electrical cable carrier tray sections which change direction at the point of connection, such that said sections are contained in one same plane, forming a flat angle, or are contained in concurrent planes, forming a dihedral angle, at the same time as they are attached, together by the side walls thereof by removable securing means.

2. Prior Art Reference

In the present art, respective rigid, straight, identical connecting parts are used for joining two coplanar aligned electrical cable carrier tray sections and they are respectively attached to the side walls and bottom walls of the ends of said sections placed end-to-end at the point of connection of both electrical cable carrier tray sections.

On the contrary, when it is a case of connecting electrical cable carrier tray sections which are not aligned at the point of connection, albeit contained in one same plane or contained in two planes in dihedral form, random means are used, such as parts hand-formed from sheet, bar or other items, which undoubtedly represent an inconvenience for the fitter, do not allow a precise installation to be made and make it unsightly.

With a view to overcoming such drawback and avoiding the production of such random means, centrally hinged connector devices have been manufactured. For the former case, they are hinged about an axis formed on the same plane as the two wings defining the devices, while for the latter case, they are hinged about an axis perpendicular to the wings which, in this case, have a mutually overlapping portion.

This latter arrangement of hinged connector devices affords the advantage of allowing any flat or dihedral angle to be formed at the point of connection where the electrical cable carrier tray sections change direction, but, on the other hand, it does not of itself allow the precise angle to be maintained in each case, whereby it must be complemented with extra supports or other arrangements. Furthermore, the lack of angular rigidity of such items and the possibility of adaptation to any angle, contribute to a summation of angular errors at the time of installing the cable carrier trays, obliging troublesome final positional corrections of the complete installation, or a strict control throughout the complete assembly thereof.

SUMMARY OF THE INVENTION

With a view to avoiding such drawbacks, the solution has been adopted of making such angular connecting portions rigidly, according to pre-established angles.

In accordance with the foregoing premises, there has been developed the connector device for electrical cable carrier trays sections of the invention which comprises at least one joining member and wherein the joining member is rigid and is differentiated in two parts, preferably of like length, forming a fixed angle therebetween which locates the apex and/or edge in the central region of the device and which have means for attachment to the trays.

One feature of the invention is that the fixed angle has a value of 135 sexagesimal degrees, measured obviously on the concave portion.

According to the invention, the two differentiated parts of the joining member comprise respective web walls which are contained substantially in one same plane when the two tray sections are not coplanar, the fixed angle formed between both walls being plane. In this case, both members of a set are mutually symmetrical and, therefore, identical.

Likewise, also according to the invention, both differentiated parts of the device comprise respective web walls that are not contained substantially within one same plane when both tray sections are coplanar, with the angle formed by both walls being dihedral. In this case, both members of a set are mutually asymmetrical.

BRIEF DESCRIPTION OF THE DRAWING

To facilitate an understanding of the present ideas, there are described hereinafter joining members according to the invention, with reference to the accompanying drawings, in which:

FIG. 1 is a perspective view of a joining member according to the invention, which is applicable to the concave dihedral angle elbow formed between two of the opposite side walls in a joint of two coplanar cable carrier trays.

FIG. 2 is a perspective view of a joining member according to the invention, which is applicable to the convex dihedral angle elbow formed between two of the opposite side walls in a joint of two coplanar cable carrier trays and forms a pair with the joining member of the previous Figure.

FIG. 3 is a perspective view of a joining member according to the invention, which is applicable to the concave plane angle elbow formed between each pair of opposite side walls in a joint of two non-coplanar cable carrier tray sections.

FIG. 4 is a perspective view of a joining member according to the invention, which is applicable to the convex plane angle elbow formed between each pair of opposite side walls in a joint of two non-coplanar cable carrier tray sections.

FIG. 5 is a perspective view of an installation of cable carrier trays in which all the joining members shown in the previous Figures are used.

FIG. 6 is a cross section view of a detail of the attachment of a joining member, according to the invention, to a cable carrier tray.

DETAILED DESCRIPTION OF THE INVENTION

In the embodiment illustrated in the drawings, the cable carrier trays 1 are formed by elongate bodies of straight U-shaped section which, extrusion molded from synthetic plastic materials, have a bottom wall 2, provided with elongated holes 3, and respective side walls 4, provided with an inwardly directed visor 5 forming a retaining rib 6, as is to be seen in the detail of FIG. 6. The elongated holes 3 are arranged lengthwise in one or more centrally aligned rows, and crosswise in each of two outer edge rows.

For this embodiment, the joining members A, B, C and D are rigid, made from synthetic plastic material and are differentiated in two parts of equal length, each of which has a web wall 7, a wide stirrup 8 provided with elongated holes 9, a lip 10 complementary of the visor 5 of the cable carrier tray 1, a central rib 11 and respective end ribs 12.

Each of the joining members A and B has its respective stirrups 8 coplanar, as shown in FIGS. 1, 2 and 5, while the respective web walls 7 thereof are not coplanar and form a dihedral angle of 135 degrees, measured on the concave side, at the same time as said stirrups 8 form plane angles of 135 degrees.

On the contrary, each of the joining members C and D has the web walls 7 thereof coplanar, forming a plane angle of 135 degrees, measured on the concave side, at the same time as the stirrups 8 are not coplanar and form dihedral angles, also of 135 degrees, as shown in FIGS. 3, 4 and 5.

In the elbows of cable carrier trays where the two sections to be joined are coplanar, a pair of asymmetrical joining members is used, such as a joining member A in the concave part of the joint and a joining member B in the convex part of the joint, as is shown in FIG. 5.

On the other hand, in the elbows where the two sections of cable carrier tray to be united form a dihedral angle, a pair of symmetrical joining members, such as a joining member C, is used on both side walls 4 when the dihedral angle is concave, and a joining member D is used, also on both side walls 4, when the dihedral angle is convex.

The attachment of the joining members A, B, C and D to the cable carrier trays 1 is carried out by engagement of the lip 10 thereof between the retaining rib 6, the visor 5 and the side wall 4 and, also, it is secured by means of screws 13 and nuts 14 passing through the transverse elongated holes 3 of the bottom wall 2 and the elongated holes 9 of the stirrups 8, such as it is shown in FIGS. 5 and 6.

The angle of 135 degrees has been chosen because it allows a change of direction of 90 degrees to be made with a large radius of curvature, which favors the gentle curving of the cables.

What I claim is:

1. A connector device for electric cable carrier tray sections, said cable carrier tray sections directly coming together at a point of connection, each of said cable carrier tray sections comprising a straight elongate U-shaped body member having arms, each of the arms of the U defining a side wall and a bottom wall extending between both side walls, said connector device comprising:

two joining members for the connection of two electrical cable carrier tray sections, said electrical cable carrier tray sections changing direction at a point of connection of the two electrical cable carrier tray sections, and being attached together by said side walls by removable securing means, wherein each of said joining members comprises a rigid piece and each of said joining members is differentiated in two parts of a same length, said parts forming a fixed angle therebetween in a central region of said joining members, each of said parts comprising:
      means for attaching to electrical cable carrier tray sections, and
      a web wall and a corresponding stirrup, said web wall being parallel to one of said side walls and having a corresponding bottom wall, and said corresponding stirrup being parallel to said corresponding bottom wall; and
   a lip extending from the web wall, the lip being received by a retaining rib extending from a visor extending from one of the side walls.

2. A connector device for electric cable carrier tray sections, according to claim 1, wherein said fixed angle has a value of 135 degrees.

3. A connector device for electrical cable carrier tray sections, according to claim 1, wherein said two differentiated parts of said joining member comprise respective web walls that are contained substantially in a same plane when said two cable carrier tray sections are not coplanar, said fixed angle formed between said two web walls being planar.

4. A connector device for electric cable carrier tray sections, according to claim 1, wherein said two differentiated parts of said joining member comprise respective web walls that are not contained substantially in one same plane when said two cable carrier tray sections are coplanar, said fixed angle formed between said two web walls being dihedral.

5. A connector device for electric cable carrier tray sections, according to claim 1, wherein said two joining members form a mirror image.

6. A connector device for electric cable carrier tray sections, according to claim 1, wherein said two joining members are different from each other.

* * * * *